(12) United States Patent
Zeng et al.

(10) Patent No.: US 11,365,624 B2
(45) Date of Patent: Jun. 21, 2022

(54) SYSTEM AND METHOD FOR MONITORING WATER INRUSH

(71) Applicants: CHINA UNIVERSITY OF MINING AND TECHNOLOGY, BEIJING, Beijing (CN); WUHAN CHANGSHENG MINE SECURITY TECHNOLOGY LIMITED, Wuhan (CN)

(72) Inventors: Yifan Zeng, Beijing (CN); Qiang Wu, Beijing (CN); Chunsheng Liu, Beijing (CN); Lina Xing, Beijing (CN)

(73) Assignees: CHINA UNIVERSITY OF MINING AND TECHNOLOGY, BEIJING, Beijing (CN); WUHAN CHANGSHENG MINE SECURITY TECHNOLOGY LIMITED, Wuhan (CN)

( * ) Notice: Subject to any disclaimer, the term of this patent is extended or adjusted under 35 U.S.C. 154(b) by 148 days.

(21) Appl. No.: 17/036,015

(22) Filed: Sep. 29, 2020

(65) Prior Publication Data

US 2021/0189870 A1    Jun. 24, 2021

(30) Foreign Application Priority Data

Dec. 24, 2019    (CN) .......................... 201911347814.1

(51) Int. Cl.
*G01V 3/26*    (2006.01)
*G01V 3/34*    (2006.01)
(Continued)

(52) U.S. Cl.
CPC ............ *E21B 47/13* (2020.05); *E21B 47/003* (2020.05); *E21F 17/06* (2013.01); *E21F 17/18* (2013.01);
(Continued)

(58) Field of Classification Search
CPC ........ E21B 47/13; E21B 47/003; E21F 17/06; E21F 17/18; G01V 3/26; G01V 3/34; G01V 3/38; G01V 3/24; G01V 9/02
See application file for complete search history.

(56) References Cited

U.S. PATENT DOCUMENTS

| | | | | | |
|---|---|---|---|---|---|
| 4,173,140 | A | * | 11/1979 | Liebman | E21F 5/14 340/626 |
| 4,295,096 | A | * | 10/1981 | Sternberg | G01V 3/06 324/357 |

(Continued)

OTHER PUBLICATIONS

Li, Shucai, et al. "Detecting and monitoring of water inrush in tunnels and coal mines using direct current resistivity method: a review." Journal of Rock Mechanics and Geotechnical Engineering 7.4 (2015): 469-478. (Year: 2015).*

(Continued)

*Primary Examiner* — Christopher P McAndrew
(74) *Attorney, Agent, or Firm* — Westbridge IP LLC (57) ABSTRACT

Disclosed is a system and a method for monitoring water inrush, including: a host terminal, a field host, at least one controller and at least one electrode array. Each electrode array is placed in one borehole and to detect electric field signals of surrounding rocks around the borehole; each controller connects with one electrode array and is to control the electrode array to carry out a high-density induced polarization measurement on the surrounding rocks; the field host connects with the controller and is to send control signals to the controller, receive and process the electric field signals output by the electrode array; and the host terminal connects with the field host and is to receive the electric field signals processed by the field host, determine changes on apparent resistivity and apparent chargeability of the surrounding rocks, and determine whether there exists water inrush according to the changes.

15 Claims, 2 Drawing Sheets

(51) Int. Cl.
    *G01V 3/38*     (2006.01)
    *G01V 9/02*     (2006.01)
    *E21B 47/13*     (2012.01)
    *E21B 47/003*     (2012.01)
    *E21F 17/06*     (2006.01)
    *E21F 17/18*     (2006.01)

(52) U.S. Cl.
    CPC .................. *G01V 3/26* (2013.01); *G01V 3/34* (2013.01); *G01V 3/38* (2013.01); *G01V 9/02* (2013.01)

(56) References Cited

U.S. PATENT DOCUMENTS

| | | | | |
|---|---|---|---|---|
| 4,642,570 | A * | 2/1987 | Sternberg | G01V 3/24 324/362 |
| 7,773,883 | B1 * | 8/2010 | Weng | H04J 14/0227 398/83 |
| 2005/0093548 | A1 * | 5/2005 | Ueda | G01V 3/06 324/357 |
| 2005/0280419 | A1 * | 12/2005 | Chen | G01V 3/265 324/324 |
| 2014/0254317 | A1 * | 9/2014 | Thompson | G01V 1/48 367/40 |

OTHER PUBLICATIONS

Control Cable web page (Year: 2018).*

* cited by examiner

SYSTEM AND METHOD FOR MONITORING WATER INRUSH

CROSS-REFERENCE TO RELATED APPLICATIONS

The present application claims priority of Chinese patent application CN201911347814.1, filed on Dec. 24, 2019, the entire contents of which are incorporated herein by reference.

TECHNICAL FIELD

The present disclosure relates to the technical field of mine water control, in particular to a system and a method for monitoring water inrush at a floor of a mine.

BACKGROUND

The formation and occurrence of a mine water disaster is a developing process. And there would exist several precursors in different stages of this developing process. Based on these precursors, predictions and early warnings on any water inrush could be implemented through micro-seismic monitoring technologies. Specifically, through micro-seismic monitoring, specific parameters of water passages can be found. These specific parameters may include space-time positions, energy and the type of the water passage. Therefore, predictions and early warnings on water inrush can be carried out according to changes on water source, water quantity, water temperature and other factors, in combination with multi-disciplinary theories such as mine pressure, hydrogeology and so on.

Conventional methods for monitoring water inrush at a floor of a mine may be carried out through micro-seismic monitoring methods or roadway high-density electric method in which the pressure and deformation of the surrounding rocks at the floor of the mine could be monitored to predict any water inrush at the floor of the mine. As you may know, the micro-seismic monitoring method and the roadway high-density electric method are both performed in the roadway of the mine. However, because of the influences of equipment in the roadway of the mine such as electromechanical devices, belts, anchor networks, tracks and power networks, the detecting results are often not accurate. On the other hand, the pressure and deformation of the surrounding rocks are not directly related to water inrush parameters. In this case, the accuracy of water inrush monitoring cannot be guaranteed. Therefore, potential safety hazards would still exist.

SUMMARY

In view of the foregoing description, the present disclosure provides a system and a method for monitoring water inrush at a floor of a mine based on borehole induced polarization. By the system and method, the accuracy of water inrush monitoring could be enhanced. Therefore, potential safety hazards would be eliminated.

According to some examples of the present disclosure, the system for monitoring water inrush may include the following parts: a host terminal, a field host, at least one controller and at least one electrode array.

In the system, the at least one electrode array may be placed in at least one borehole at the floor of the mine and is to detect electric field signals of surrounding rocks around the at least one borehole at the floor of the mine.

The at least one controller connects with the at least one electrode array one by one and is to control the at least one electrode array to carry out a high-density induced polarization measurement on the surrounding rocks around the at least one borehole at the floor of the mine.

The field host connects with the at least one controller and is to send control signals to the at least one controller, receive the electric field signals output by the at least one electrode array through the at least one controller and process the electric field signals received.

The host terminal connects with the field host and is to receive the electric field signals processed by the field host, determine changes on apparent resistivity and apparent chargeability of the surrounding rocks, and determine whether there exists water inrush in the surrounding rocks according to the changes.

One would know that water source, water quantity and water passages are the three necessary conditions for a mine water disaster. The high-density induced polarization measurement can monitor faults of stratal configuration, collapse columns and changes of water passages. On condition that water exists in the above structures, the value of the apparent resistivity measured through the high-density induced polarization measurement would become smaller, while the value of the apparent chargeability measured through the high-density induced polarization measurement would become larger.

Accordingly, in examples of the present disclosure, the at least one electrode array is placed in the at least one borehole at the floor of the mine, and the at least one electrode array would carry out a high-density induced polarization measurement on the surrounding rocks around the at least one borehole through the control of the at least one controller. According to examples of the present disclosure, whether there is any water inrush would be well detected by monitoring the changes on the value of the apparent resistivity and the value of the apparent chargeability of the surrounding rocks around the at least one borehole at the floor of the mine. It is apparent that the system and method disclosed by the present disclosure would solve the problems caused by the locality and concealment of water passages (faults and collapse columns) and also eliminate the influences on the high-density induced polarization measurement caused by factors such as anchor rods, anchor cables, anchor nets, tracks and the like in the roadway. Therefore, the accuracy of water inrush monitoring would be greatly increased.

According to some examples of the present disclosure, there would be a plurality of electrode arrays. Each of the electrode arrays may be placed in one borehole at the floor of the mine. Moreover, the number of the at least one controller would be the same with the number of the electrode arrays. And each controller would connect with one electrode array. The field host would connect with the at least one controller in series connection.

Through the arrangement of multiple electrode arrays, water inrush at different positions can be monitored simultaneously. Meanwhile, various electrode arrangement modes can be adopted by the multiple electrode arrays. Therefore, rich geological information with section structure characteristics can be obtained through the multiple electrode arrays.

According to some examples of the present disclosure, one electrode array may include at least four electrodes connected in series connection. In the electrode array, the electrodes may be distributed at equal intervals, and the distance between every two adjacent electrodes may be 1 m to 5 m.

According to some examples of the present disclosure, the electrode may include a circuit board and a copper ring. In the electrode, the circuit board may connect with the copper ring. The circuit board may include a control and amplification circuit and a switch. The circuit board is to control the copper ring to switch among the at least one switch, that is, switch between a power supply electrode and a measuring electrode and amplify electric field signals on the copper ring.

According to some examples of the present disclosure, the field host may include a central controller, a transmitter, a receiving amplifier, a digitizer, a memory, an optical network port, a human-computer interaction device and a power supply.

The transmitter may connect with the at least one controller and is to transmit control signals to the at least one controller.

The receiving amplifier may connect with the at least one controller and is to receive and amplify the electric field signals output by the at least one electrode array.

The digitizer may connect with the receiving amplifier and is to digitize the electric field signals output by the receiving amplifier.

The optical network port may connect with the host terminal and is to carry out communications between the host terminal and the field host.

According to some examples of the present disclosure, the system for monitoring water inrush may further include an explosion-proof intrinsic safe power supply. The explosion-proof intrinsic safe power supply is to supply power to the field host.

Some other examples of the present disclosure also provide a method for monitoring water inrush. The method may be performed by the system for monitoring water inrush disclosed above. The method may include the following steps: transmitting, by the field host, control signals to the at least one controller; controlling, by each controller, the electrode array to carry out a high-density induced polarization measurement; transmitting, by each electrode array, electric field signals of the surrounding rocks around a borehole at the floor of the mine to the host terminal through the controller and the field host; calculating, by the host terminal, the changes on the apparent resistivity and the apparent chargeability of the surrounding rocks according to the electric field signals; and determining, by the host terminal, whether there exists any water inrush at the floor of the mine according to the changes.

As can be seen from examples of the present disclosure, the at least one electrode array is placed in one of the at least one borehole at the floor of the mine, and each electrode array would carry out a high-density induced polarization measurement on the surrounding rocks around the at least one borehole through the control of its corresponding controller and the field host. Then, whether there is any water inrush would be well detected by monitoring the changes on the value of the apparent resistivity and the value of the apparent chargeability of the surrounding rocks around the at least one borehole at the floor of the mine.

The present disclosure would solve the problems caused by the locality and concealment of water passages (faults and collapse columns) and also eliminate the influence on the high-density induced polarization measurement caused by factors such as anchor rods, anchor cables, anchor nets, tracks and the like in the roadway. Therefore, the accuracy of water inrush monitoring would be greatly increased.

Further, according to examples of the present disclosure, the value of the apparent resistivity and the value of the apparent chargeability of the surrounding rocks around the at least one borehole at the floor of the mine would be monitored in real time. Since when water inrush occurs at the floor of a mine, the value of the apparent resistivity and the value of the apparent chargeability of the surrounding rocks around one or more boreholes at the floor of the mine would change in a certain way, so that the system disclosed can monitor the water inrush at the floor of the mine timely and accurately.

Moreover, the arrangement of the at least one electrode array can be completed at one time. Therefore, faults or interferences caused by the arrangement of electrodes may be reduced, and the foundation may be laid for rapid and automatic data measurement. In addition, full automation of underground mine data acquisition may be achieved. Therefore, errors caused by manual operation can be avoided, cost of performing the monitoring process can be reduced, the efficiency of the monitoring process can be greatly improved and the information measured may be greatly enriched.

BRIEF DESCRIPTION OF DRAWINGS

In order to illustrate the examples of the present disclosure more clearly, reference will now be made to the accompanying drawings, which are incorporated in and constitute a part of this specification.

DETAILED DESCRIPTION OF THE EMBODIMENTS

To further clarify the objects, aspects and advantages of the present disclosure, a more particular description of the disclosure will be rendered by reference to specific examples thereof which are illustrated in the appended drawings.

It should be noted that all expressions using "first" and "second" in this disclosure are to distinguish two different entities or two non-identical parameters with a same name. It can be seen that the term "first" and "second" is only used for the convenience of statement. They should not be interpreted as restrictions to embodiment. All expressions using "comprise/comprises/comprising", "include/includes/including" and as such in this disclosure are to express that the element before such expression comprises the elements and their equivalents after such expression, and can also comprise other elements. All expressions using "connect/connects/connecting" and as such in this disclosure refer not only to physical or mechanical connections but also electric connections, no matter a connection is direct or indirect. All expressions using "up", "down", "left" and "right" in this disclosure are to express relative locations of two objects. When the location of an object change, the relative location of this object in view of another object may also change accordingly.

As stated above, one would know that water source, water quantity and water passages are the three necessary conditions for a mine water disaster. A high-density induced polarization measurement (also called high-density electric survey or high-density electric method) can monitor the faults of stratal configuration, the collapse columns and the changes of water passages. On condition that water exists in the above-mentioned structures, the value of apparent resistivity obtained through the high-density induced polarization measurement would become smaller, while the value of apparent chargeability obtained through the high-density induced polarization measurement would become larger.

In examples of the present disclosure, at least one electrode array may be placed in at least one borehole at a floor of a mine. Each electrode array could carry out a high-density induced polarization measurement on the surrounding rocks around a borehole where the electrode array is placed to detect the changes on the value of the apparent resistivity and the value of the apparent chargeability of the surrounding rocks. As one would know that water inrush would occur at the floor of the mine when the surrounding rocks around the floor have cracks on it and the cracks are infiltrated by water. And in this case, because of water in the cracks, the apparent resistivity of the surrounding rocks would reduce, while the apparent chargeability of the surrounding rocks would increase. While in the examples of the present disclosure, since the at least one borehole at the floor of the mine may be drilled through the coal seam, down to the aquifer near the floor, any changes on the apparent resistivity and the apparent chargeability of the surrounding rocks would be measured timely and accurately. Therefore, any water inrush would be detected and forecast timely and accurately based on the changes on the apparent resistivity and the apparent chargeability of the surrounding rocks around the floor of the mine.

Technical solutions of the present disclosure will now be described in further detail with reference to the accompanying drawings and specific examples.

Figure 1:
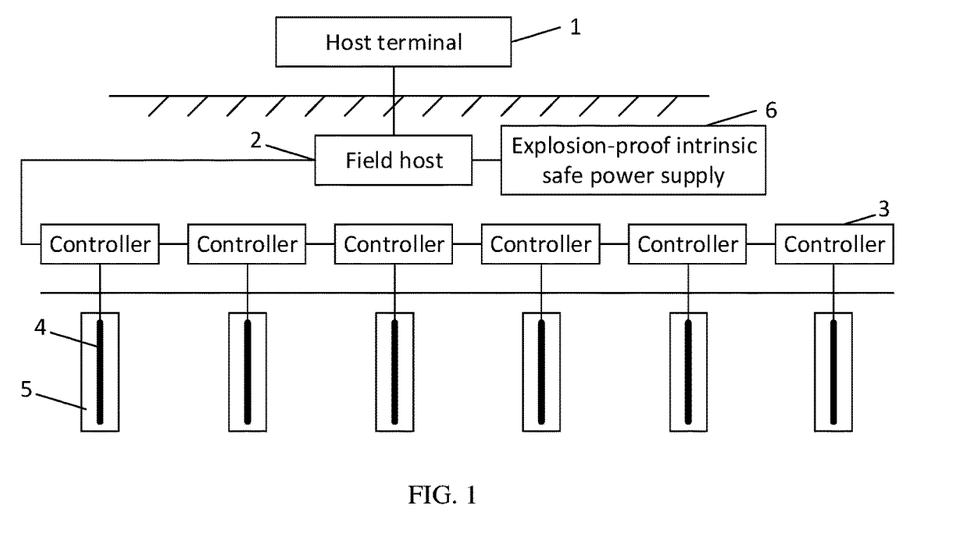
FIG. 1 is a schematic diagram illustrating the structure of a system for monitoring water inrush at a floor of a mine according to some example of the present disclosure.

FIG. 1 is a schematic diagram illustrating the structure of a system for monitoring water inrush at a floor of a mine according to some example of the present disclosure. As shown in FIG. 1, the system may include: a host terminal 1, a field host 2, at least one controller 3 and at least one electrode array 4.

According to some examples of the present disclosure, there would be six electrode arrays 4 in the system disclosed. Each electrode array may be placed in one borehole at the floor of the mine. The number of the controllers 3 may be the same as the number of the electrode arrays 4. Each controller 3 may connect with one electrode array 4. Moreover, the field host 2 may connect with the at least one controller 3 in series connection. According to some other examples of the present disclosure, the number of the at least one electrode array 4 would be any integer. Through the arrangement of multiple electrode arrays 4, water inrush at different positions of the floor of the mine can be monitored simultaneously. Meanwhile, various electrode arrangement modes can be adopted by the multiple electrode arrays 4. Therefore, rich geological information with section structure characteristics can be obtained through the multiple electrode arrays 4.

The electrode array 4 may be configured to detect electric field signals of the surrounding rocks around the borehole 5 where it is placed. The controller 3 may be configured to control the electrode array 4 to carry out the high-density induced polarization measurement on the surrounding rocks.

The field host 2 may be configured to send control signals to the at least one controller 3 to control the at least one electrode array 4 to carry out high-density induced polarization measurements, receive and process the electric field signals output by the at least one electrode array 4.

The host terminal 1 may connect with the field host 2 and may be configured to receive the electric field signals processed by the field host 2, determine the changes on the apparent resistivity and the apparent chargeability of the surrounding rocks, and determine whether there exists any water inrush in the surrounding rocks according to the changes determined.

According to some examples of the present disclosure, the system for monitoring water inrush may further include an explosion-proof intrinsic safe power supply 6. The explosion-proof intrinsic safe power supply 6 may be configured to supply power to the field host 2.

The specific structure of an electrode array 4 according to examples of the present disclosure is not strictly limited. For example, an electrode array 4 can be formed by connecting at least one electrode in series connection.

Figure 2:
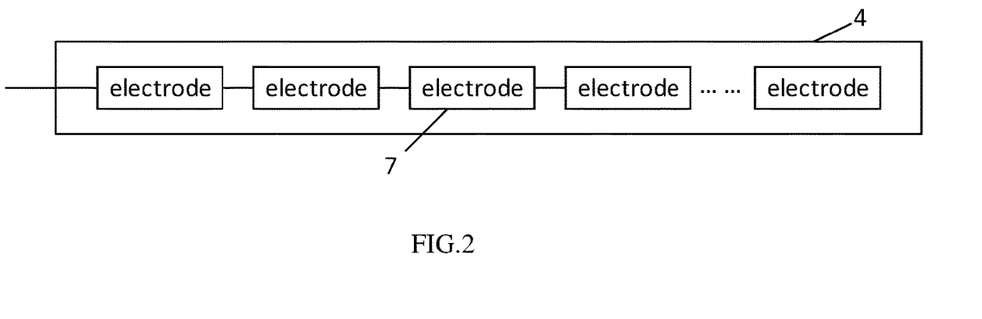
FIG. 2 is a schematic diagram illustrating the structure of an electrode array according to some example of the present disclosure.

FIG. 2 is a schematic diagram illustrating the structure of an electrode array 4 according to some examples of the present disclosure. As shown in FIG. 2, an electrode array 4 may include at least four electrodes 7 connecting with each other in series connection. In FIG. 2, the electrodes 7 may be distributed at equal intervals. According to some examples of the present disclosure, the distance between every two adjacent electrodes 7 may be 1 m to 5 m.

Through the arrangement of multiple electrodes 7, the apparent resistivity and the apparent chargeability of the surrounding rocks around different parts of a borehole, such as different parts from top to bottom or form bottom to top of the borehole, can be measured. Therefore, the position where abnormal apparent resistivity or abnormal apparent chargeability appears can be determined. And based on the detection results, whether any water inrush exists in the surrounding rocks around the borehole at the floor of the mine can be determined.

Figure 3:
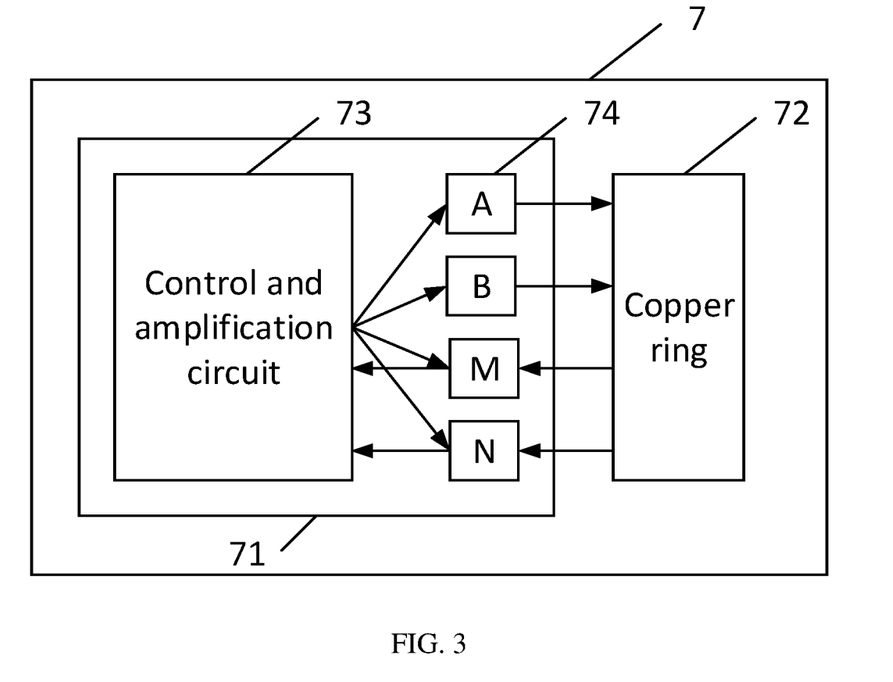
FIG. 3 is a schematic diagram illustrating the structure of an electrode according to some example of the present disclosure.

FIG. 3 is a schematic diagram illustrating the structure of an electrode 7 according to some example of the present disclosure. As shown in FIG. 3, the electrode 7 may include a circuit board 71 and a copper ring 72. In an electrode 7, the circuit board 71 may connect with the copper ring 72. According to some examples of the present disclosure, the circuit board 71 may include a control and amplification circuit 73 and at least one switch 74 arranged on it. The circuit board 71 is to control the copper ring 72 to switch among the at least one switch 74, that is, switch between power supply electrodes and measuring electrodes and amplify electric field signals of the copper ring 72.

Specifically, according to some examples of the present disclosure, the number of the switches 74 may be set as four. That is, the switches may include switch A, switch B, switch M and switch N. In these examples, switch A may refer to a positive electrode A of the power supply electrodes; switch B may refer to a negative electrode B of the power supply electrodes. When the copper ring 72 connects to switches A and B, the copper ring 72 connects to the power supply electrodes to perform a power supply function. Switch M may refer to a measuring electrode M and switch N may refer to another measuring electrode N. When the copper ring 72 connects to switches M and N, the copper ring 72 connects to the measuring electrodes to perform a measurement function. The control and amplification circuit 73 may connect with the four switches 74 respectively. The control and amplification circuit 73 may control the copper ring 72 to connect with switch A and switch B to connect to the power supply electrodes, or control the copper ring 72 to connect with switch M and switch N to measure voltages between the measuring electrodes by the high-density induced polarization measurement. So that the electrode 7 may be controlled to switch between the power supply electrodes and the measuring electrodes.

Figure 4:
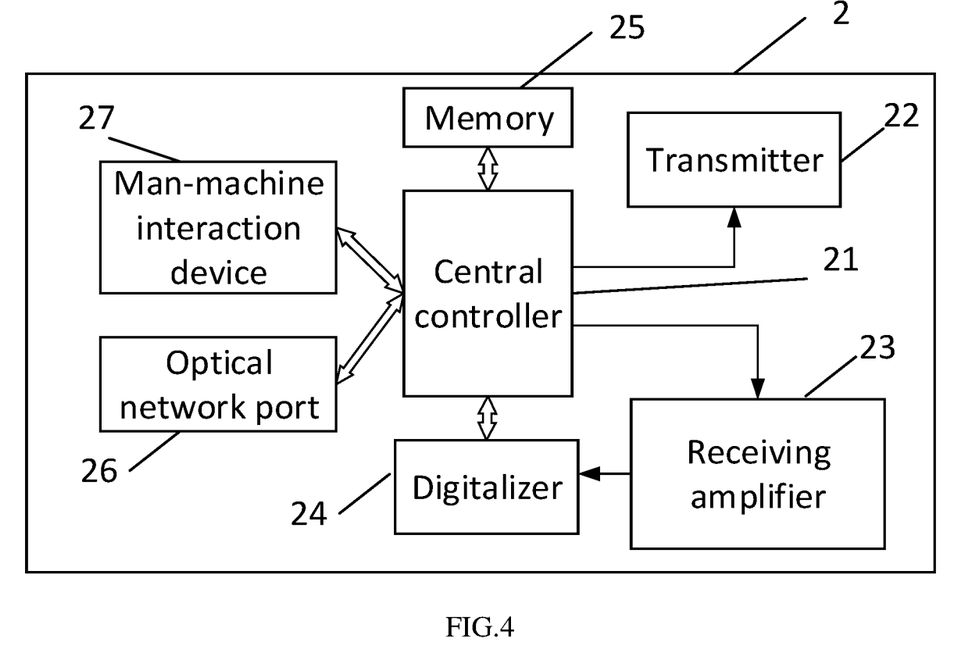
FIG. 4 is a schematic diagram illustrating the structure of a field host according to some example of the present disclosure.

FIG. 4 is a schematic diagram illustrating the structure of a field host 2 according to some example of the present disclosure. As shown in FIG. 4, the field host 2 may include a central controller 21, and a transmitter 22, a receiving amplifier 23, a digitizer 24, a memory 25, an optical network port 26, a human-computer interaction device 27 and a power supply (which is not shown in FIG. 4) connecting to the central controller 21 respectively.

The transmitter 22 may connect with the central controller 21 and the at least one controller 3, and is to transmit control signals to the controller 3. Specifically, the transmitter 22 may refer to a circuit that can generate various current signals with different frequencies (or pulse widths) and transmit the various current signals to the at least one electrodes array 4 through the at least one controller 3. Further, the circuit can provide power supply to the at least one electrodes array 4 through the at least one controller 3.

The receiving amplifier 23 may connect with the central controller 21 and the at least one controller 3, and is to receive and amplify the electric field signals output by the at least one electrode array 4. Specifically, the receiving amplifier 23 may refer to a circuit that can amplify, filter and trap filter the electric field signals measured by the at least one electrodes array 4, that is, voltages between every measuring electrodes pair of measuring electrode M and measuring electrode N.

The digitizer 24 may connect with the receiving amplifier 23 and the central controller 21, and is to digitize the signals output by the receiving amplifier 23. Specifically, the digitizer 24 may refer to a circuit that can perform an analog-to-digital conversion to the signals output by the receiving amplifier 23.

The memory 25 may connect with the central controller 21 and is to store instructions to be executed by the central controller 21.

The optical network port 26 may connect with the host terminal 1 and the central controller 21, and is to carry out communications between the host terminal 1 and the field host 2.

The human-computer interaction device 27 may connect with the central controller 21 and is to perform a human-computer interaction with the user. Specifically, the human-computer interaction device 27 may refer to a key board or a mouse through which the user may input data and instructions. Further, the human-computer interaction device 27 may also refer to a display through which a human-computer interface may be displayed.

The power supply is to supply power to the above-mentioned modules in the field host 2.

The central controller 21 is to execute instructions stored in the memory 25 to control the at least one electrode array 4 to carry out a high-density induced polarization measurement through the at least one controller 3.

Specifically, the field host 2 may control every electrode array 4 to complete power supply and measurement functions.

According to some examples of the present disclosure, the field host 2 may connect with the at least one controller 3 through a comprehensive control cable. The comprehensive control cable may include two first power supply wires, two first control wires, two first power wires, a first signal wire and a first shielding wire.

Specifically, the two first power supply wires are to supply power to the at least one electrode array 4 to provide electric field signals. The two first control wires are to control communications between the field host 2 and the at least one controller 3. The two first power wires are to supply power to the at least one controller 3. The first signal wire is to transmit monitoring signals. And the first shielding wire is to shield external electromagnetic interference.

According to some examples of the present disclosure, the at least one controller 3 may connect with the at least one electrode array 4 through a multi-core cable. The multi-core cable may include two measuring wires, two second power supply wires, two second control wires, two second power wires, a second signal wire and a second shielding wire.

Specifically, the two second power supply wires may connect with the at least one electrode array 4 and the two first power supply wires and are to provide electric field signals to the at least one electrode array 4. The two second control wires are to connect the at least one controller 3 with the at least one electrode array 4, through which the at least one controller 3 may control the communications with the at least one electrode array 4. The two second power wires are to supply power to the circuit board in the electrode 7. The two measuring wires are to measure amplified electric field signals output by the at least one electrode array 4. The second signal wire is to output amplified electric field signals. And the second shielding wire is to shield electromagnetic interference.

Based on the system disclosed above, some other examples of the present disclosure provide a method for monitoring water inrush at a floor of a mine based on borehole induced polarization. The method may be implemented by the system disclosed above. According to some examples of the present disclosure, firstly, the following steps should be taken to setup the system for monitoring water inrush at a floor of a mine.

a, drilling at least one borehole 5 at a floor of a mine;
b, placing one electrode array 4 in each borehole 5;
c, filling and sealing the at least one borehole 5 with cement slurry;
d, connecting each electrode array 4 with a controller 3 through a multi-core cable;
e, connecting each controller 3 with a field host 2 in series connection through a comprehensive control cable;
f, connecting the field host 2 with a host terminal 1 through an industrial optical ring network.

By the above process, a system for monitoring water inrush can be established. Then the field host 2 would be started to monitor water inrush at the floor of the mine through the control of the host terminal 1.

Based on the above system, the method for monitoring water inrush at the floor of the mine would include the following steps.

A, transmitting, by the field host 2, a control signal and/or a control signal to monitor a specific position to the at least one controller 3.

B, controlling, by each controller 3, corresponding electrode array 4 to carry out a high-density induced polarization measurement.

C, transmitting, by each electrode array 4, an electric field signal of the surrounding rocks around the borehole 5 at the floor of the mine obtained through the high-density induced polarization measurement to the host terminal 1 through the controller 3 and the field host 2.

D, calculating, by the host terminal 1, the changes on the apparent resistivity and the apparent chargeability according to electric field signals received.

E, determining, by the host terminal 1, whether there exists any water inrush at the floor of the mine according to the changes.

According to some examples of the present disclosure, the changes may include the difference between the apparent resistivity of the surrounding rocks measured and a reference apparent resistivity and the difference between the apparent chargeability of the surrounding rocks measured and a reference apparent chargeability.

According to some examples of the present disclosure, the reference apparent resistivity may be an average value of at least one apparent resistivity of the surrounding rocks measured in an initial preparing process. Wherein, the at least one reference apparent resistivity measured in the initial detecting process are also called as apparent resistivity background value. And the reference apparent chargeability may be an average value of at least one apparent chargeability of the surrounding rocks measured in the initial preparing process. Wherein, the at least one reference apparent chargeability measured in the initial detecting process are also called as apparent chargeability background value.

According to some examples of the present disclosure, in the above step E, determining whether there exists any water inrush at the floor of the mine according to the changes may include the following steps.

On condition that the change on the apparent resistivity of the surrounding rocks is smaller than a first threshold and the change on the apparent chargeability of the surrounding rocks is smaller than a second threshold, it is determined that no water inrush exists in the surrounding rocks. While on condition that the change on the apparent resistivity of the surrounding rock is larger than or equal to a first threshold, the change on the apparent chargeability of the surrounding rocks is larger than or equal to the second threshold, and the position where abnormal apparent resistivity or abnormal apparent chargeability appears gradually evolves from top to bottom or from bottom to top of the borehole, it is determined that water inrush does exist in the surrounding rocks. Here, the abnormal apparent resistivity refers to the change on the apparent resistivity of the surrounding rocks is larger than or equal to a first threshold, and the abnormal apparent chargeability refers to the change on the apparent chargeability of the surrounding rocks is larger than or equal to the second threshold.

According to some examples of the present disclosure, the first threshold may be set as twice the standard deviation of the apparent resistivity background values of the surrounding rocks. The second threshold may be set as twice the standard deviation of the apparent chargeability background values of the surrounding rocks.

The method disclosed would then be described in more detailed with examples.

Firstly, the system for monitoring water inrush may be placed in a roadway of a coal mine. Specifically, the host terminal 1 is placed on the ground and is used for starting and controlling the field host 2 to work. The field host 2, the at least one controller 3 and the at least one electrode array 4 are placed underground to carry out a high-density induced polarization measurement on the surrounding rocks around at least one borehole 5 at the floor under the coal seam. Then the detection results of the at least one electrode array 4, that is, the electric field signals of the surrounding rocks around the at least one borehole 5 at the floor of the mine, may be transmitted to the host terminal 1 by the underground at least one controller 3 and the underground field host 2. And the host terminal 1 may calculate the apparent resistivity and apparent chargeability of the surrounding rocks according to the electric field signals received, and then determine the changes on the apparent resistivity and apparent chargeability of the surrounding rocks.

Specifically, the electric field signals received may include voltages between every two measuring electrodes corresponding to various current signals with different frequencies. In this case, the host terminal 1 may obtain a power supply current I, a low frequency potential difference $V_D$ and a high frequency potential difference $V_G$ corresponding to each measuring electrodes pair of measuring electrode M and measuring electrode N. Then the host terminal 1 may calculate the apparent chargeability (or the apparent amplitude frequency) $F_S$ and the apparent resistivity $\rho_S$ based on the following equations.

$$F_S = \frac{V_D - V_G}{V_G} \times 100\%$$

$$\rho_S = \frac{KV_D}{I}$$

Wherein, K refers to the electrode coefficient.

In one example of the present disclosure, the apparent resistivity of the surrounding rocks around the at least one borehole 5 at the floor measured is 300 Ω/m (the average of the apparent resistivity background values of the floor is 400 Ω/m, and the standard deviation is 25 Ω/m). It can be seen that, the change on the apparent resistivity of the surrounding rocks around the at least one borehole 5 at the floor is 100 Ω/m, which is greater than twice the standard deviation (which is 50 Ω/m). Meanwhile, the apparent chargeability of the surrounding rocks around the at least one borehole 5 at the floor measured is 15% (the average of the apparent chargeability background values of the floor is 8%, and the standard deviation is 2%). It can be seen that, the change on the apparent chargeability of the surrounding rocks around the at least one borehole 5 at the floor is 7%, which is greater than twice the standard deviation (which is 4%). Moreover, the host terminal 1 detects that the positions where these abnormal apparent resistivity and abnormal apparent chargeability appear evolve gradually from top to bottom or from bottom to top of the borehole. In this case, the host terminal 1 may determine that water inrush exists in surrounding rocks around the at least one borehole 5 at the floor of the coal mine.

Through the above process, any water inrush in surrounding rocks around the at least one borehole 5 at the floor of the coal mine may be detected and forecast.

As can be seen from examples of the present disclosure, each of the at least one electrode array 4 is placed in one of the at least one borehole 5 at the floor of the mine, and each electrode array 4 would carry out a high-density induced polarization measurement on the surrounding rocks around the borehole 5 through the control of the corresponding controller 3 and the field host 2. Then, whether there is any water inrush would be well measured by host terminal 1 through monitoring the changes on the value of the apparent resistivity and the value of the apparent chargeability of the surrounding rocks around the borehole 5.

The present disclosure would solve the problems caused by the locality and concealment of water passages (faults and collapse columns) and also eliminate the influence on the high-density induced polarization measurement caused by factors such as anchor rods, anchor cables, anchor nets, tracks and the like in the roadway. Therefore, the accuracy of water inrush monitoring would be greatly increased.

Further, the arrangement of the at least one electrode array can be completed at one time. Therefore, faults and interferences caused by the arrangement of electrodes may be reduced, and the foundation may be laid for rapid and automatic data measurement. In addition, full automation of underground mine data acquisition may be achieved. Therefore, errors caused by manual operation can be avoided, cost of performing the monitoring process can be reduced, the efficiency of the monitoring process can be greatly improved and the information measured may be greatly enriched.

One ordinary skilled in the art will appreciate that the discussion of any of the above examples is merely exemplary and is not intended to imply that the scope of the disclosure, including the claims, is limited to these examples. The above examples or technical features in different examples may also be combined under the idea of the disclosure, the steps may be implemented in any order, and there are many other variations of different aspects of the disclosure as described above, which are not provided in detail for the sake of brevity.

In addition, well-known power/ground connections to integrated circuit (IC) chips and other components may or may not be shown in the figures provided for simplicity of illustration and discussion and to not obscure the present disclosure. Furthermore, means may be shown in block diagram form in order to avoid obscuring the disclosure, and this also takes into account the fact that details regarding implementations of such block diagram means are highly dependent on the platform in which the disclosure is to be implemented (i.e., such details should be well within the purview of one skilled in the art). While specific details (e.g., circuits) have been set forth in order to describe exemplary examples of the application, it will be apparent to those skilled in the art that the application may be practiced without these specific details or with variations of these specific details. Accordingly, the description is to be regarded as illustrative in nature, and not as restrictive.

While the application has been described in conjunction with specific examples thereof, many alternatives, modifications and variations thereof will be apparent to those skilled in the art in light of the foregoing description. For example, other memory architectures (e.g., dynamic RAM (DRAM)) may use the examples discussed.

The present examples are intended to embrace all such alternatives, modifications and variances that fall within the broad scope of the appended claims. Therefore, it is intended that any omissions, modifications, equivalents, improvements and the like be included within the spirit and scope of the present disclosure.

What is claimed is:

1. A system for monitoring water inrush at a floor of a mine, comprising: a host terminal, a field host, at least one controller and at least one electrode array; wherein,
the at least one electrode array is placed in at least one borehole at the floor of the mine and to detect electric field signals of surrounding rocks around the at least one borehole;
each of the at least one controller connects with one of the at least one electrode array and is to control the electrode array to carry out a high-density induced polarization measurement on the surrounding rocks;
the field host connects with the at least one controller and is to send control signals to the at least one controller, receive and process the electric field signals output by the at least one electrode array through the at least one controller; and
the host terminal connects with the field host and is to receive the electric field signals processed by the field host, determine changes on apparent resistivity and apparent chargeability of the surrounding rocks, and determine whether there exists water inrush at the floor of the mine according to the changes; wherein,
the electrode array comprise at least four electrodes connected in series connection and distributed at equal intervals; and
the electrode comprises a circuit board and a copper ring; wherein,
the circuit board connects with the copper ring;
the circuit board comprises a control and amplification circuit and at least one switch;
the circuit board is to control the copper ring to switch among the at least one switches and amplify electric field signals on the copper ring.

2. The system according to claim 1, wherein, the number of the at least one controller is the same with the number of the at least one electrode arrays.

3. The system according to claim 1, wherein, the field host connects with the at least one controller in series connection through a comprehensive control cable.

4. The system according to claim 3, wherein, the comprehensive control cable comprises two first power supply wires, two first control wires, two first power wires, a first signal wire and a first shielding wire; wherein,
the two first power supply wires are to supply power to the at least one electrode array to provide electric field signals;
the two first control wires are to control communications between the field host and the at least one controller;
the two first power wires are to supply power to the at least one controller;
the first signal wire is to transmit monitoring signals; and
the first shielding wire is to shield external electromagnetic interference.

5. The system according to claim 1, wherein, the distance between every two adjacent electrodes is 1 m to 5 m.

6. The system according to claim 1, wherein, the field host comprises a central controller, and a transmitter, a receiving amplifier, a digitizer, a memory, an optical network port, a human-computer interaction device and a power supply connecting to the central controller; wherein,
the transmitter connects with the at least one controller and is to transmit control signals to the at least one controller;
the receiving amplifier connects with the at least one controller and is to receive and amplify the electric field signals output by the at least one electrode array;
the digitizer connects with the receiving amplifier and is to digitize signals output by the receiving and amplifying module; and
the optical network port connects with the host terminal and is to carry out communications between the host terminal and the field host.

7. The system according to claim 1, further comprising:
an explosion-proof intrinsic safe power supply; wherein,
the explosion-proof intrinsic safe power supply is to supply power to the field host.

8. The system according to claim 1, wherein, the at least one controller connects with the at least one electrode array through a multi-core cable.

9. The system according to claim 8, wherein, the multi-core cable comprises two measuring wires, two second power supply wires, two second control wires, two second power wires, a second signal wire and a second shielding wire; wherein,
- the two second power supply wires connect with the at least one electrode array and the two first power supply wires are to provide electric field signals to the at least one electrode array;
- the two second control wires are to connect the at least one controller with the at least one electrode array, through which the at least one controller controls the communications with the at least one electrode array;
- the two second power wires are to supply power to the circuit board in the electrode;
- the two measuring wires are to measure amplified electric field signals output by the at least one electrode array;
- the second signal wire is to output amplified electric field signals; and
- the second shielding wire is to shield electromagnetic interference.

10. The system according to claim 1, wherein, the host terminal connects with the field host through an industrial optical ring network.

11. A method for monitoring water inrush at a floor of a mine performed by the system according to claim 1, comprising:
- transmitting, by the field host, control signals to the at least one controller;
- controlling, by each controller, the electrode array to carry out a high-density induced polarization measurement;
- transmitting, by each electrode array, electric field signals of the surrounding rocks around a borehole at the floor of the mine to the host terminal through the controller and the field host;
- calculating, by the host terminal, the changes on the apparent resistivity and the apparent chargeability of the surrounding rocks according to the electric field signals; and
- determining, by the host terminal, whether there exists any water inrush at the floor of the mine according to the changes; wherein,
- determining, by the host terminal, whether there exists any water inrush at the floor of the mine according to the changes comprises:
- on condition that the change on the apparent resistivity of the surrounding rocks is smaller than a first threshold and the change on the apparent chargeability of the surrounding rocks is smaller than a second threshold, it is determined that no water inrush exists in the surrounding rocks; and
- on condition that the change on the apparent resistivity of the surrounding rock is larger than or equal to the first threshold, the change on the apparent chargeability of the surrounding rocks is larger than or equal to the second threshold, and the position where abnormal apparent resistivity or abnormal apparent chargeability appears gradually evolves from top to bottom or from bottom to top of the borehole, it is determined that water inrush does exist in the surrounding rocks; wherein,
- the first threshold is twice the standard deviation of apparent resistivity background values of the surrounding rocks; and
- the second threshold is twice the standard deviation of the apparent chargeability background values of the surrounding rocks.

12. The method according to claim 11, wherein, the changes comprise the difference between the apparent resistivity measured and a reference apparent resistivity and the difference between the apparent chargeability measured and a reference apparent chargeability.

13. The method according to claim 12, wherein, the reference apparent resistivity is an average value of at least one reference apparent resistivity measured in an initial detecting process; and the reference apparent chargeability is an average value of at least one reference apparent chargeability measured in the initial detecting process.

14. The method according to claim 11, further comprising:
- controlling, by the host terminal, each of the at least one electrode array to carry out the high-density induced polarization measurement individually via the field host and the controller.

15. The method according to claim 11, further comprising:
- drilling at least one borehole at a floor of a mine;
- placing one electrode array in each borehole;
- filling and sealing the at least one borehole with cement slurry;
- connecting each electrode array with a controller through a multi-core cable;
- connecting each controller with a field host in series connection through a comprehensive control cable; and
- connecting the field host with a host terminal through an industrial optical ring network.

* * * * *